(12) United States Patent
Hoshi et al.

(10) Patent No.: US 7,984,950 B2
(45) Date of Patent: Jul. 26, 2011

(54) SEAT HEIGHT ADJUSTING DEVICE FOR AUTOMOBILE

(75) Inventors: Masayuki Hoshi, Takanezawa-machi (JP); Shinji Sugiyama, Takanezawa-machi (JP); Masami Yoshida, Takanezawa-machi (JP)

(73) Assignee: TS Tech Co., Ltd., Saitama (JP)

( * ) Notice: Subject to any disclaimer, the term of this patent is extended or adjusted under 35 U.S.C. 154(b) by 572 days.

(21) Appl. No.: 11/909,998

(22) PCT Filed: Mar. 31, 2006

(86) PCT No.: PCT/JP2006/307416
§ 371 (c)(1),
(2), (4) Date: Oct. 31, 2008

(87) PCT Pub. No.: WO2006/104288
PCT Pub. Date: Oct. 5, 2006

(65) Prior Publication Data
US 2009/0127907 A1 May 21, 2009

(30) Foreign Application Priority Data

Mar. 31, 2005 (JP) ................................ 2005-105421
Mar. 31, 2005 (JP) ................................ 2005-105422
Mar. 31, 2005 (JP) ................................ 2005-105423
Mar. 31, 2005 (JP) ................................ 2005-105424
Mar. 31, 2005 (JP) ................................ 2005-105425

(51) Int. Cl.
*B60N 2/16* (2006.01)
(52) U.S. Cl. ......... 297/344.12; 297/344.15; 297/344.14; 297/344.1

(58) Field of Classification Search .................. 297/338, 297/344.12, 344.15, 344.1, 344.14; 248/421
See application file for complete search history.

(56) References Cited

U.S. PATENT DOCUMENTS

| 4,973,105 | A | * | 11/1990 | Itou ........................ 297/344.12 |
| 5,775,661 | A | * | 7/1998 | Matsumoto et al. ......... 248/421 |
| 7,278,686 | B2 | * | 10/2007 | Yoshida ....................... 297/338 |
| 7,517,020 | B2 | * | 4/2009 | Yokota ................... 297/344.15 |

FOREIGN PATENT DOCUMENTS

| JP | 57-95224 | 6/1982 |
| JP | 59-22019 | 2/1984 |
| JP | 2-254 | 1/1990 |
| JP | 2000-108734 | 4/2000 |
| JP | 2000-127813 | 5/2000 |
| JP | 2000-355237 | 12/2000 |
| JP | 2001-138789 | 5/2001 |
| WO | 2004/094180 | 11/2004 |

* cited by examiner

*Primary Examiner* — David Dunn
*Assistant Examiner* — Erika Garrett
(74) *Attorney, Agent, or Firm* — Shoemaker and Mattare

(57) ABSTRACT

An automobile seat height adjuster includes a linkage base frame between the seat's side frames and seat brackets so as to be vertically swingable. The base frame has two pairs of linkage members interconnected by respective shafts. Each of the linkage members extends between one of the side frames and one of the brackets so as to be collapsable. A power transmission mechanism transmits to the linkage base frame power generated by operation of an operating knob and causes the linkage base frame to swing vertically, thereby causing the seat to move vertically. Stops on the linkage base frame abut the installation surfaces, limiting downward movement of the seat and keeping the seat in a lowermost position at which side frames of the seat are spaced from the installation surfaces.

16 Claims, 8 Drawing Sheets

«SEAT HEIGHT ADJUSTING DEVICE FOR AUTOMOBILE»

SEAT HEIGHT ADJUSTING DEVICE FOR AUTOMOBILE

TECHNICAL FIELD

The present invention relates to a device for adjusting a height of an automobile seat.

BACKGROUND ART

Hitherto, there has been proposed an automobile seat which is provided with a height adjusting device for adjusting a height of the automobile seat. Moreover, such a height adjusting device is applied to a slide-type seat for an automobile, which can be slid forward and rearward in the automobile (International Publication No. WO2004/094180A1, Japanese Patent Application Laid-Open No. 2000-108734, Japanese Patent Application Laid-Open No. 2000-127813, and Japanese Patent Application Laid-Open No. 2001-138789).

Referring now to FIG. 1, an automobile seat provided with the conventional height adjusting device will be discussed hereinafter in order to facilitate understanding of the present invention. The automobile seat includes a slide rail mechanism S which comprises a pair of spaced apart lower rail members R and a pair of spaced apart upper rail members A slidably supported to the lower rail members R (only one lower rail member R and only one upper rail member A are shown in FIG. 1). The upper rail members A have forward and rearward brackets 1a, 1b provided thereon so as to stand up from the upper rail members A. The height adjusting device includes a linkage base frame 15 which is provided between the forward and rearward brackets 1a, 1b and side frames 2 of a seat cushion of the seat (only one side frame 2 is shown in FIG. 1). More particularly, the linkage base frame 15 comprises forward linkage members 3 and rearward linkage members 4 (only one forward linkage member 3 and only one rearward linkage member 4 are shown in FIG. 1). The forward linkage members 3 are pivotally supported at lower end portions thereof to the forward brackets 1a by support pins 3a and supported at upper end portions thereof to the side frames 2 by support pins 3b, so that the forward linkage members 3 are bridged between the forward brackets 1a and the side frames 2. A connecting shaft 5 interconnects the forward linkage members 3. The rearward linkage members 4 are pivotally supported at lower end portions thereof to the rearward brackets 1b by support pins 4a and supported at intermediate portions thereof to the side frames 2 by support pins 4b, so that the rearward linkage members 4 are bridged between the rearward brackets 1b and the side frames 2. A connecting shaft 6 is connected to the support pins 4b, to thereby interconnect the rearward linkage members 4.

In order that the linkage base frame 15 is actuated, the height adjusting device further includes an operating knob 7 arranged outside one of the side frames 2 with a rotating shaft 7a thereof penetrating through the one of the side frames 2, a pinion gear 8 arranged inside the one of the side frames 2 and mounted on an inner end portion of the rotating shaft 7a, a sector gear 9 arranged inside the one of the side frames 2, rotatably supported, via a support pin 9a, to the one of the side frames 2 and meshed with the pinion gear 8, and a rod 10 coupled between the sector gear 9 and corresponding one of the rearward linkage members 4 by means of support pins 9b, 11. Moreover, a gear cover 12 for covering the pinion gear 8 and the sector gear 9 from an inward direction is mounted onto an inner surface of the side frame 2. The rotating shaft 7a of the operating knob 7, which supports the pinion gear 8, and the support pin 9a of the sector gear 9 are held by the side frame 2 and the gear cover 12.

In the automobile seat provided with the conventional height adjusting device, when the seat is in a lowermost position, the forward and rearward linkage members 3, 4 are inclined rearward. In this condition, when the operating knob 7 is manually operated so as to be rotated in a direction, the pinion gear 8 is rotated and the sector gear 9 is then rotated about the support pin 9a, whereby the rod 10 is pulled so as to be moved forward. The forward movement of the rod 10 causes the rearward linkage members 4 to be pivoted about the support pins 4a so as to stand up and causes the forward linkage members 3 to be pivoted about the support pins 3a so as to stand up, whereby the seat is lifted up, namely, the seat is adjusted to a high position. Re-adjusting of the height of the seat in the lowermost position can be performed by causing the operating knob 7 to be rotated in the reverse direction.

In the seat provided with the conventional height adjusting device, when the seat is lowered and arrives at the lowermost position, the side frames 2 of the seat are abutted against the upper rail members A on which the brackets 1a, 1b are provided, whereby the downward movement of the seat is stopped. Therefore, when an occupant on the seat intends to cause the seat to be excessively lowered and operates the operating knob 7, or when any excessive load is applied to the seat which has been in the lowermost position, the side frames 2 are strongly abutted against upper surfaces of the upper rail members A on which the brackets 1a, 1b are provided. As a result, portions of the side frames 2 and portions of the upper rail members A which are strongly abutted against each other are deformed and/or damaged. Particularly, when the side frames 2 are deformed, to thereby cause the sector gear 9 and/or the pinion gear 8 to become jolted, there is a possibility that the engagement between the sector gear 9 and the pinion gear 8 will become poor.

Moreover, in a case where the height adjusting device is applied to a slide-type automobile seat with a position sensor system, in which position sensors, electrical wirings thereof and/or the like (any automotive electronic parts and/or the like) are arranged on upper surfaces of upper rail members of a slide rail mechanism or arranged in the vicinity of the upper rail members, when the occupant on the seat operates the operating knob in such a manner that the seat is excessively lowered, or any excessive load is applied to the seat in a condition where the seat has been in a lowermost position, side frames of the seat are abutted against the position sensors, the electrical wirings and/or the like, to thereby cause them to be damaged.

Moreover, the height adjusting device comprises several parts including the forward and rearward linkage members 3, 4 which are supported to the side frames 2 of the seat cushion, and the operating knob 7, the pinion gear 8, the sector gear 9, and the rod 10 which are supported to the one of the side frames 2, so that the structures of the side frame and/or arrangement of the parts around the side frame is likely to become complicated. Particularly, a considerable load, such as a weight load of the seat itself and/or a weight load of the occupant on the seat, is applied to the support pins 3b, 4b supporting the forward and rearward linkage members 3, 4, and the support pin 9a of the sector gear 9, so that positional relationships among them with respect to the side frame are hard to be determined, and the structure of the height adjusting device is likely to become complicated.

Moreover, in the height adjusting device for the automobile seat, if the rigidity of the linkage base frame 15 is poor and a considerable load is applied to the linkage base frame 15, the forward and rearward linkage members 3, 4 and parts around them are made to flex, so that the seat is hard to be stably supported, and/or it is hard to carry out the adjusting of the height of the seat. Therefore, it is desired that good rigidity of the linkage base frame 15 is ensured. However, the forward linkage member 3 which is arranged in the vicinity of the parts including the operating knob 7, the pinion gear 8, the sector gear 9 and the rod 10 is required not to interfere with their operations, so that the arrangement and shape of the forward linkage member 3 is considerably limited and it is not easy to ensure the good rigidity of the linkage base frame 15.

Moreover, in the height adjusting device for the automobile seat, the entire weight load of the seat is applied to the forward and rearward linkage members 3, 4 and, in a condition where the occupant has sat on the seat, the weight load of the occupant is additionally applied to them. When the height of the seat is to be adjusted, lifting of the linkage base frame 15 must be performed against the total weight load by only operating the operating knob, so that a considerable force is required in order to operate the operating knob and, therefore, it is hard to operate the operating knob.

In order to overcome the above problem, there has been proposed a height adjusting device in which biasing means for biasing the linkage base frame in such a direction that the linkage base frame is swung up is employed and, therefore, the linkage base frame can be easily swung up (for example, Japanese Patent Application Laid-Open Nos. 2000-108734 and 2000-127813). However, in order that a biasing force which is enough for a load including the entire weight load of the seat and the weight load of the occupant can be obtained, large-sized biasing means must be employed. Moreover, in the height adjusting device disclosed in Japanese Patent Application Laid-Open No. 2000-108734, the size of the biasing means is reduced by employing an eccentric shaft. However, it is necessary to ensure a movement of the eccentric shaft. Therefore, there is a problem that the height adjusting device becomes large-sized and a lowermost position of the seat is inevitably set so as to become high.

Moreover, in the height adjusting device for the automobile seat, the pinion gear 8, the sector gear 9, and the rod 10 are arranged inside the one of the side frames 2, and one of the forward linkage members 3 is arranged adjacent them, so that they must be arranged in such a manner that their operations are not interfered with one another, their structures are likely to become complicated, and their operations are considerably restricted. Therefore, in order that they can be effectively and smoothly operated, the structure of the height adjusting device is likely to become complicated.

SUMMARY OF THE INVENTION

It is an object of this invention to provide a height adjusting device for adjusting a height of an automobile seat, which, with a simple construction, facilitates preventing of side frames of a seat cushion of the seat from being contacted, in a lowermost position of the seat, with installation-surfaces on which brackets for supporting the seat through the adjusting device are mounted, and, therefore, facilitates preventing the side frames and the installation-surfaces from being damaged and/or deformed.

It is another object of this invention to provide a seat height adjusting device to be applied to a slide type automobile seat provided with a position sensor system, which positively facilitates preventing of position sensors of the position sensor system and wirings thereof from being damaged by side frames of a seat cushion of the seat.

It is still another object of this invention to provide a seat height adjusting device, in which the number of support pins employed to support several elements for the height adjusting device can be reduced and, therefore, a construction of the height adjusting device is simplified.

It is yet another object of this invention to provide a seat height adjusting device which includes a linkage base frame to which high rigidity is provided with a simple construction, and which can stably support the seat.

It is still another object of this invention to provide a seat height adjusting device which includes a linkage base frame for supporting the seat and an operating knob for operating the linkage base frame, wherein the operating knob can be easily operated and the height adjusting device can cause a lowermost position of the automobile seat to be adjusted to a lower position.

It is yet another object of this invention to provide a seat height adjusting device which includes a linkage base frame for supporting the seat, an operating knob for operating the linkage base frame, and power transmission means for transmitting power, generated according to operation of the operating knob, to the linkage base frame, wherein the power transmission means can be smoothly and stably actuated.

In accordance with the present invention, there is provided with a height adjusting device for adjusting a height of a seat for an automobile, the automobile seat including a seat cushion having first and second spaced apart side frames, and spaced apart brackets provided on predetermined installation-surfaces for supporting the seat through the height adjusting device. The height adjusting device comprises a linkage base frame provided between the first and second side frames and the brackets so as to be vertically swingable, so that the seat is supported through the linkage base frame to the brackets so as to be vertically movable, the linkage base frame comprising a pair of forward linkage members spaced apart from each other, a first connecting shaft interconnecting the forward linkage members, a pair of rearward linkage members spaced apart from each other, and a second connecting shaft interconnecting the rearward linkage members, each of the forward and rearward linkage members being bridged between corresponding one of the first and second side frames and corresponding one of the brackets so as to be collapsable, an operating knob arranged outside one of the first and second side frames and supported to the one of the first and second side frames, power transmission means coupling the operating knob and the linkage base frame for transmitting to the linkage base frame power generated according to operation of the operating knob and causing the linkage base frame to be vertically swung, to thereby cause the seat to be vertically moved, and stopper means provided at the linkage base frame for abutting against the installation-surfaces and limiting downward movement of the seat and keeping the seat in a lowermost position at which the first and second side frame frames of the seat are spaced apart from the installation surfaces.

The stopper means may comprise projection-shaped stopper portions projecting from portions of the forward and rearward linkage members which are adapted to be opposed to the installation surfaces when the linkage base frame is swung downward.

The seat may include a slide rail mechanism. The slide rail mechanism comprises a pair of lower rail members mounted on a floor of the automobile and a pair of upper rail members slidably supported to the lower rail members, and a position sensor system provided at the slide rail mechanism for sensing relative positions between the upper rail members and the lower rail members, the position sensor system including position sensors provided on the upper rail members. In this case, each of the brackets is mounted on corresponding one of the upper rail members, and the stopper means is adapted to serve as means to causes the position sensors to be spaced apart from the side frames when the seat reaches the lowermost position.

The power transmission means may include a power transmission member supported, via a support pin, to the one of the first and second side frames so as to be rotatable about the support pin according to the operation of the operating knob, and a rod coupled between corresponding one of the rearward linkage members and a portion of the power transmission member which is eccentric from the support pin, one of the forward linkage members being supported, through the support pin, to the one of the first and second side frames. In this case, the support pin is penetrated through the one of the first and second side frames, the power transmission member is arranged outside the one of the first and second side frame and supported to the support pin, and the one of the forward linkage members is arranged inside the one of the first and second side frame and supported to the support pin.

The one of the forward linkage members may include a body portion supported to corresponding one of the brackets and a prolongation portion extending from the body portion. In this case, the portion of the power transmission member and the rod are connected to the prolongation portion of the one of the first and second forward linkage members. The body portion of the one of the forward linkage members is supported to the support pin supporting the power transmission member. Moreover, the body portion of the one of the forward linkage members and the power transmission member are supported to the support pin so as to be rotatable relative to each other, the portion of the power transmission member and the rod are connected to each other by a connecting pin, the prolongation portion of the one of the forward linkage members is formed with an elongated through-hole of a circular arc-shape, and the connecting pin is inserted through the elongated through-hole.

The height adjusting device may include spiral springs arranged inside the first and second side frames for biasing the linkage base frame in such a direction that the linkage base frame stands up, the spiral springs being fixed at innermost end portions thereof to the support pins and wound around the support pins. Outermost end portions of the spiral springs wound around the support pins are engaged with the forward linkage members.

The one of the first and second side frames may have a gear case which is arranged outside the one of the first and second side frames and mounted to the one of the first and second side frames. In this case, the operating knob has a rotating shaft penetrated through the gear case and the one of the first and second side frame, and the power transmission means further includes a pinion gear housed within the gear case and mounted on the rotating shaft of the operating knob, and a sector gear serving as the power transmission member, housed within the gear case, meshed with the pinion gear and supported through the support pin to the one of the first and second side frames so as to be rotatable about the support pin according to the operation of the operating knob.

The operating knob may be provided with a ratchet mechanism for allowing rotation of the rotating shaft to be releasably stopped per a predetermined angle of the rotation of the rotating shaft.

The one of the first and second side frames has an elongated through-hole formed therein. In this case, the connecting pin is penetrated through the elongated through-hole of the one of the first and second side frames, and the pinion bear is arranged forwardly of the connecting pin in the gear case. The sector gear and the pinion gear are interposedly held by the gear case and the one of the first and second side frames so as to be rotatable.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals denote the same parts throughout the Figures and wherein.

DETAILED DESCRIPTION OF THE PREFERRED EMBODIMENT

Figure 1:
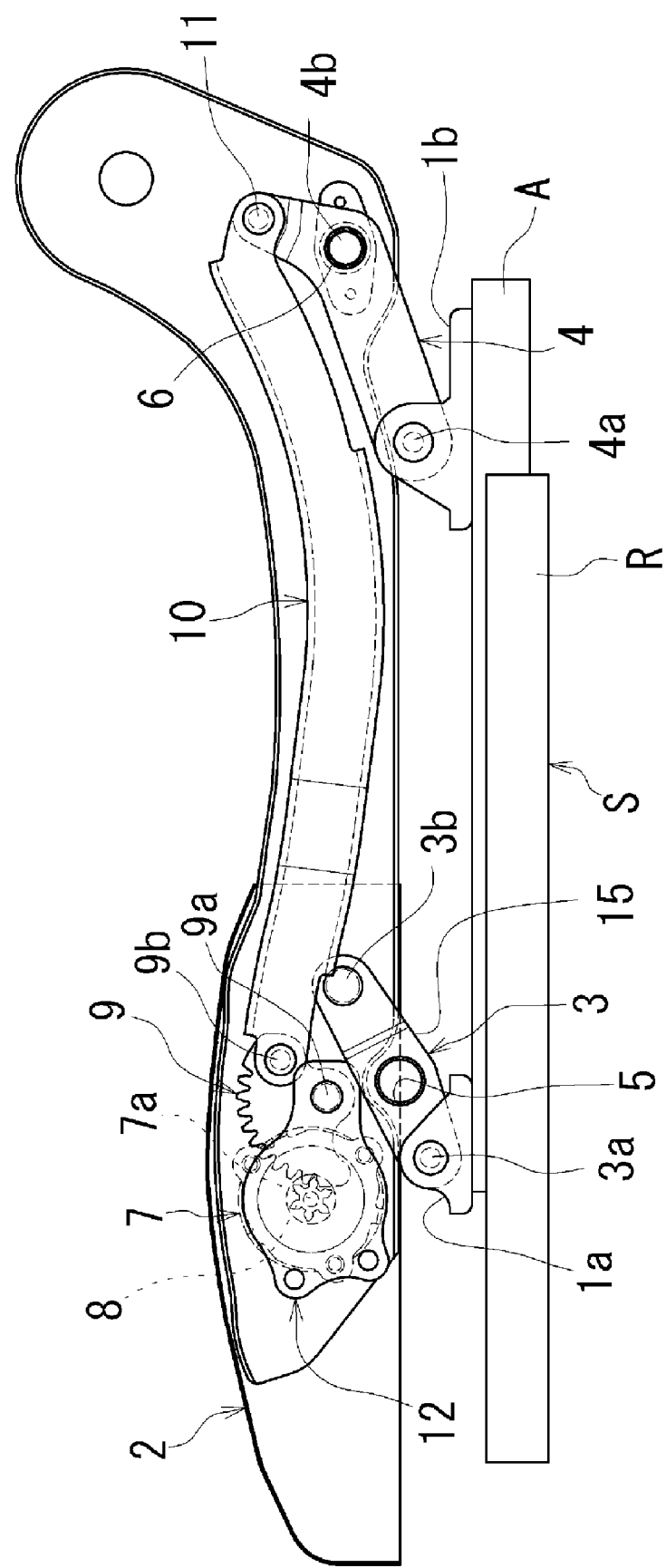
FIG. 1 is a schematic side view of a conventional height-adjusting device for an automobile seat in which the seat is in a lower position.
Figure 2:
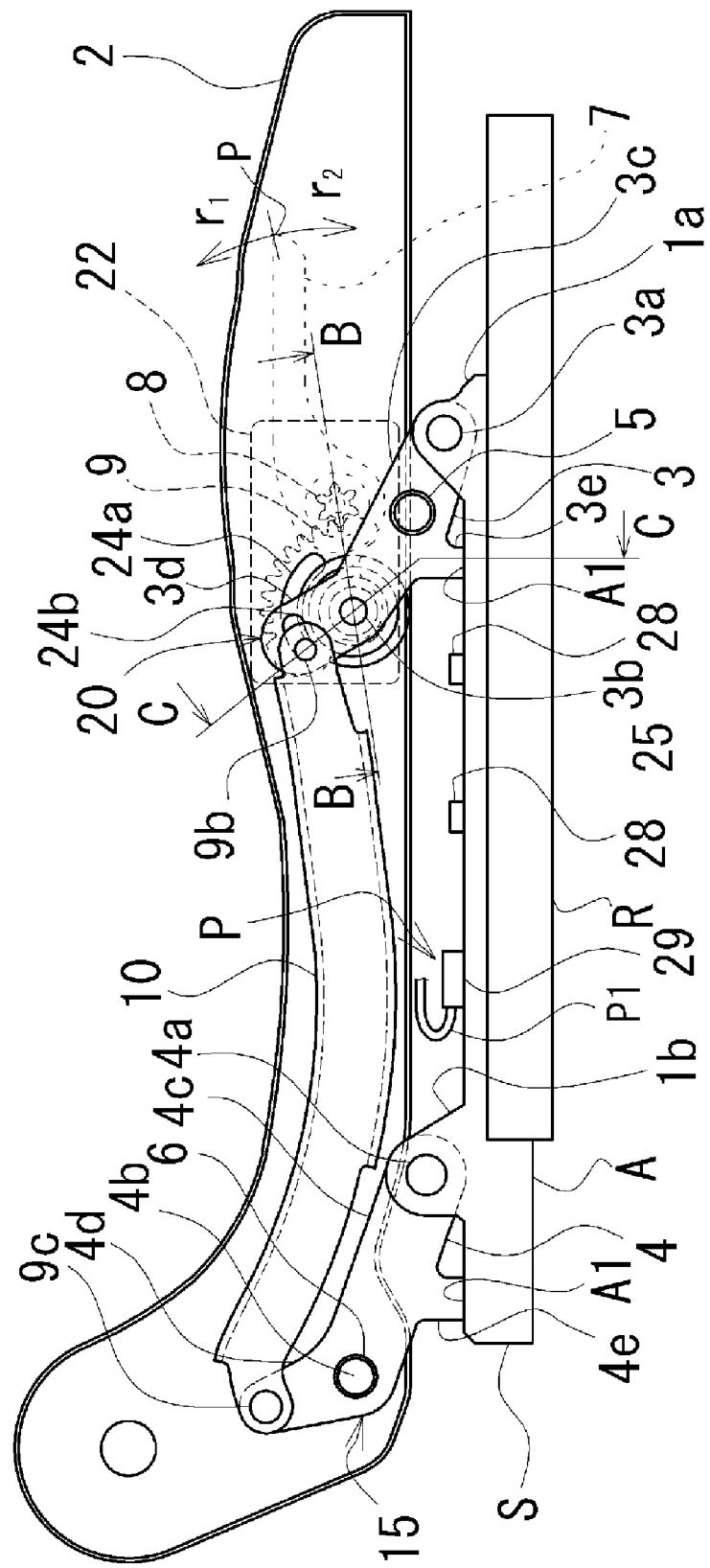
FIG. 2 is a schematic side view of a height adjusting device for an automobile seat according to the present invention, in which the seat is in a lowermost position.

A preferred embodiment of a height adjusting device for adjusting a height of an automobile seat, according to the present invention, will be discussed hereinafter with reference to FIGS. 2 to 8. Referring now to FIG. 2, the height adjusting device is employed as means to adjust a height of an entire seat adapted to be slid forward and rearward via a slide rail mechanism S in an automobile. The slide rail mechanism S comprises a pair of lower rail members R (only one lower rail member R is shown in FIG. 2) mounted on a floor of the automobile, and a pair of upper rail members A (only one upper rail member A is shown in FIG. 2) slidably engaged with the lower rail members R.

In the automobile seat, the height adjusting device includes a linkage base frame 15 as a base thereof. The linkage base frame 15 is provided between forward and rearward brackets 1a, 1b, which are provided on the upper rail members A so as to stand up from the upper rail members A, and spaced apart side frames 2 of a seat cushion of the seat (only one side frame 2 is shown in FIG. 2). The linkage base frame 15 is arranged inside the side frames 2 and comprises forward linkage members 3 (only one forward linkage member 3 is shown in FIG. 2), rearward linkage members 4 (only one rearward linkage member 4), a first connecting shaft 5 interconnecting the forward linkage members 3, and a second connecting shaft 6 interconnecting the rearward linkage members 4. The forward linkage members 3 and the rearward linkage members 4 are bridged between the side frames 2 and the forward brackets 1a, and between the side frames 2 and the rearward brackets 1b, respectively.

The forward linkage members 3 are disposed inside the side frames 2 and symmetrical with respect to each other. Each of the forward linkage members 3 is formed into a substantially L-plate-shape, and comprises a body portion 3c and a prolongation portion 3d extending in an upper and rearward direction from the body portion 3c. The forward linkage members 3 are supported at substantially middle portions thereof to the side frames 2 by first and second support pins 3b and pivotally supported at lower end portions thereof to the forward brackets 1a by support pins 3a, so that the forward linkage members 3 are provided so as to be bridged between the side frames 2 and the forward brackets 1a.

The rearward linkage members 4 are also disposed inside the side frames 2. One of the rearward linkage members 4, namely, a first rearward linkage member 4 is formed into a substantially L-plate-shape, and comprises a body portion 4c and a prolongation portion 4d extending in an upper and rearward direction from the body portion 4c. The other (not shown) of the rearward linkage members 4, namely, a second rearward linkage member comprises a substantially linear plate-shaped body having a length corresponding to that of the body portion 4c of the first rearward linkage members 4.

The rearward linkage members 4 are connected to each other by the second connecting shaft 6 which has support pins 4b projecting outward from both ends thereof and is coupled between a substantially middle portion of the first rearward linkage member 4 and an upper end portion of the second rearward linkage member. The rearward linkage members are pivotally supported at lower end portions thereof to the rearward brackets 1b by support pins 4a and supported to the side frames 2 by causing the support pins 4b of the second connecting shaft 6 to be penetrated through the side frames 2, so that the rearward linkage member 4 are bridged between the side frames 2 and the rearward brackets 1b.

In the illustrated example, a distance between the support pins 4a, 4b of each of the rearward linkage members 4 is set so as to become longer than a distance between the support pins 3a, 3b of each of the forward linkage members 3.

Each of the forward linkage members 3 has a projection-shaped stopper portion 3e provided at a lower side of the body portion 3c thereof which faces a corresponding upper rail member A when the forward linkage member 3 is pivoted downward around the support pin 3a. Similarly, each of the rearward linkage members 4 has a projection-shaped stopper portion 4e provided at a lower side of the body portion thereof which faces a corresponding upper rail member A when the rearward linkage member 4 is pivoted downward around the support pin 4a. The stopper portions 3e, 4e are adapted to be abutted against abutment regions A1 of the upper rail members A when the linkage base frame 15 is swung downward and the seat then arrives at a lowermost position. Thus, the downward movement of the seat is restricted by the stopper portions 3e, 4e. In the condition where the stopper portions 3e, 4e have been abutted against the abutment regions A1 of the upper rail members A, the upper rail members A on which the forward and rearward brackets 1a, 1b are provided, and the side frames 2 of the seat cushion are kept spaced apart from each other as shown in FIG. 2.

Figure 3:
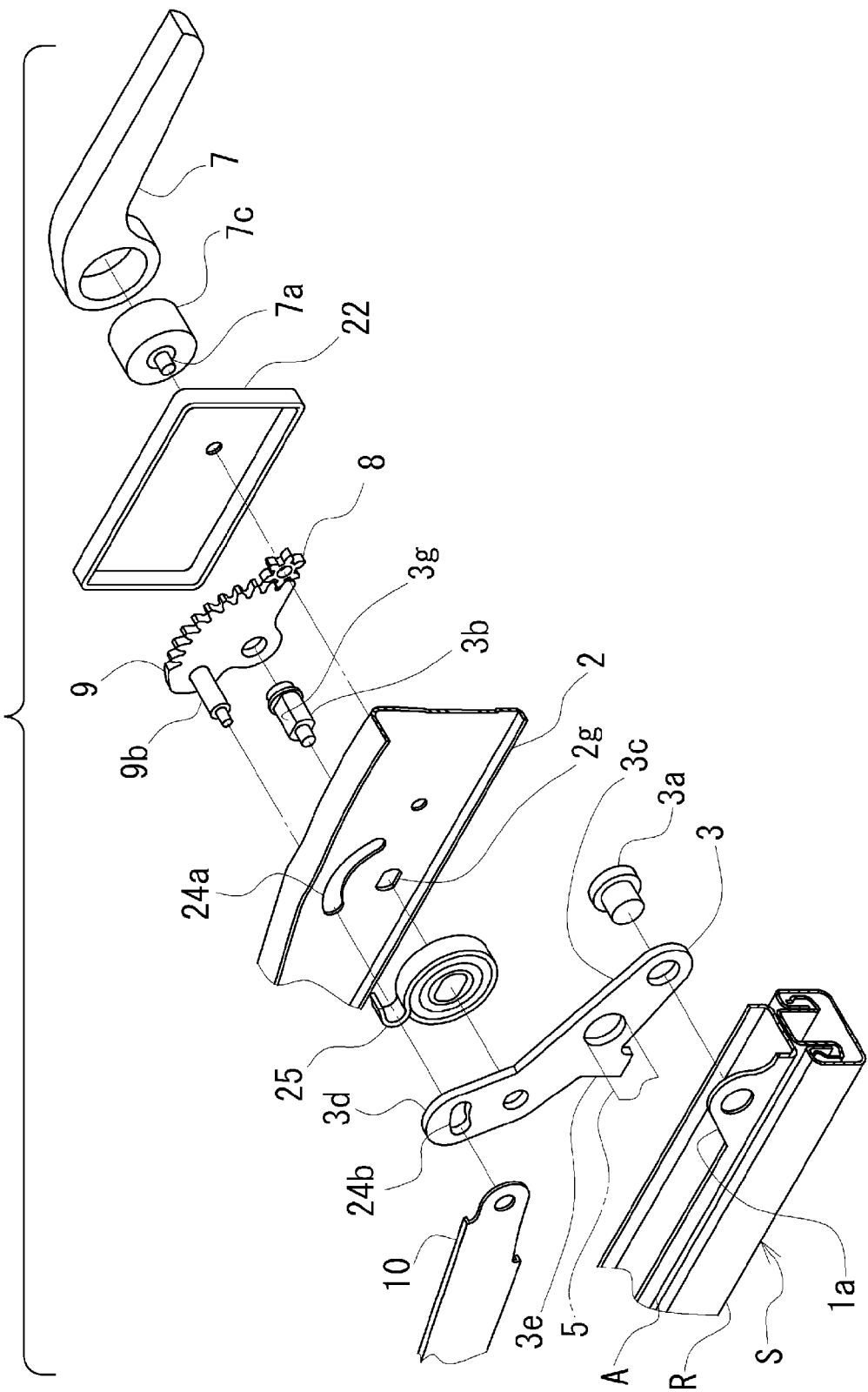
FIG. 3 is a schematic exploded perspective view of a mechanism arranged in the vicinity of a forward linkage member of the height adjusting device according to the present invention.
Figure 4:
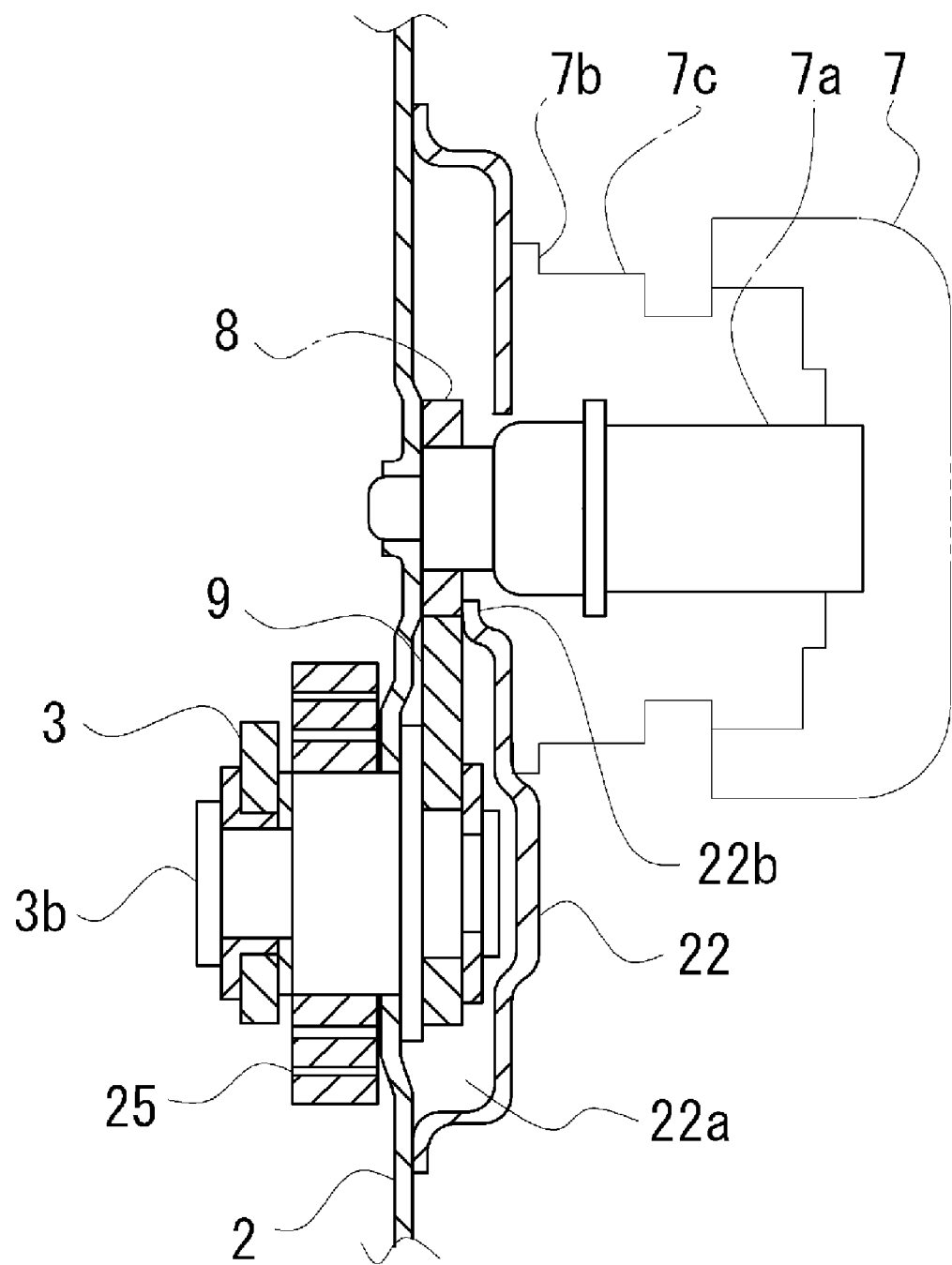
FIG. 4 is a schematic sectional view taken along a line B-B in FIG. 2.

Referring to FIGS. 3 and 4, an operating knob 7 for causing the linkage base frame 15 to be vertically swung is arranged outside one of the side frames 2, namely, a first side frame 2. The operating knob 7 and the linkage base frame 15 are connected to each other via power transmission means 20.

The operating knob 7 is formed into a lever-shape and supported to a gear case 22 which is disposed outside the first side frame 2 and mounted to the first side frame 2. The operating knob 7 is provided with a rotating shaft 7a and a ratchet mechanism 7c for allowing rotation of the rotating shaft 7a to be releasably stopped per a predetermined angle of the rotation of the rotating shaft 7a. The operating knob 7 is supported, through a supporting portion 7b (FIG. 4) which is mounted on the gear case 22, to the gear case 22 and the first side frame 2, with a tip end portion of the rotating shaft 7a thereof being penetrated through the gear case 22 and the first side frame 2.

As shown in FIG. 2, the operating knob 7 can be rotated from a neutral position p to an upward direction r1 and a downward direction r2 by a predetermined amount, by manual operation of the operating knob 7, and is adapted to be automatically returned to the neutral position P by any suitable return spring when the operating knob 7 is released from the manual operation. Repeated rotation and return of the operating knob 7 causes the ratchet mechanism 7c to be actuated, whereby an amount of the rotation of the rotating shaft 7a can be increased or reduced. As the ratchet mechanism 7c, there may be employed any suitable conventional ratchet mechanism.

The power transmission means 20 comprises a pinion gear 8 which is fixedly mounted on the rotating shaft 7a of the operating knob 7 so as to be rotatable together with the rotating shaft 7a, and housed within a housing space 22a defined between the first side frame 2 and the gear case 22, a sector gear 9 housed within the housing space 22a and meshed with the pinion gear 8 so as to be rotatable together with the pinion gear 8, and a rod 10 arranged inside the first side frame 2 and coupled between the sector gear 9 and the prolongation portion 4d of the first rearward linkage member 3 arranged adjacent the first side frame 2.

The first support pin 3b of one of the forward linkage members 3 which is disposed adjacent the first side frame 2, namely, the first support pin 3b of a first forward linkage member 3 is penetrated through the first side frame 2. The sector gear 9 is rotatably supported to one end portion of the first support pin 3b so as to be rotatable around the first support pin 3b.

As shown in FIG. 3, the first support pin 3b of the first forward linkage member 3 has a pair of opposite parallel surfaces 3g around a periphery thereof. The first side frame 2 is formed with a through-hole 2g which has a shape corresponding to that of a cross-section of the first support pin 3b of the first forward linkage member 3. The first support pin 3b is fitted through the through-hole 2g of the first side frame 2 so as to be unrotatable relative to the first side frame 2.

The sector gear 9 is rotatably supported to the one end portion of the first support pin 3b as discussed above and the first forward linkage member 3 is rotatably supported to the other end portion of the first support pin 3b, so that the sector gear 9 can be rotated coaxially with the first forward linkage member 3.

The sector gear 9 is formed into a substantially sector-shape spreading around the first support pin 3b, and is meshed at a circular arc-shaped, toothed portion thereof with the pinion gear 8, so that the sector gear 9 is rotated within a range of the circular arc-shaped, toothed portion, according to the rotation of the pinion gear 8 by the operating knob.

The pinion gear 8 and the sector gear 9 are housed within the housing space 22a, so that displacement of the pinion gear 8 and sector gear 9 is restricted between an outer surface of the first side frame 2 and an inner surface of the gear case 22. In the illustrated example, a portion of the gear case 22 which surrounds a through-hole of the gear case 22 through which the rotating shaft 7a of the operating knob 7 is penetrated is provided with an inwardly deformed region 22b (FIG. 4). The pinion gear 8 and the sector gear 9 are interposedly held between the inwardly deformed region 22b of the gear case 22 and the first side frame 2 so as to be rotatable, so that relative displacement of meshed areas of the pinion gear 8 and sector gear 9 can be positively restricted.

Figure 5:
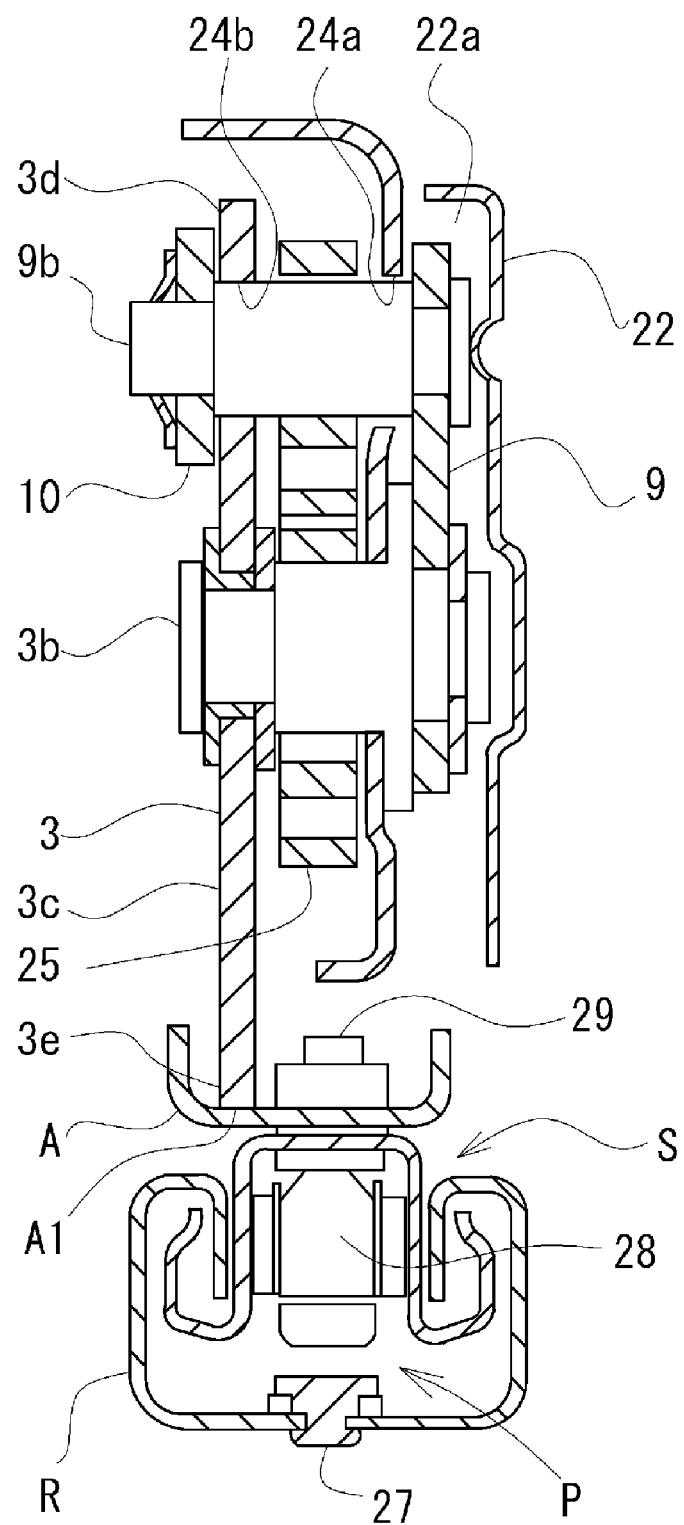
FIG. 5 is a schematic sectional view taken along a line C-C in FIG. 2.

As shown in FIGS. 3 and 5, the sector gear 9 has a connecting pin 9b integrally formed at a portion thereof, which is eccentric from the first support pin 3b penetrating through the sector gear 9, so as to project inwardly from the sector gear 9. On the other hand, the first side frame 2 has an elongated through-hole 24a of a circular arc-shape formed in a portion thereof which positionally corresponds to the connecting pin 9b of the sector gear 9. The elongated through-hole 24a extends around the first support pin 3b penetrating through the first side frame 2. The connecting pin 9b of the sector gear 9 is inserted through the elongated through-hole 24a and projected inside the first side frame 2. A length of the elongated through-hole 24a is set so as to allow the sector gear 9 to be rotated by a predetermined maximum amount.

Moreover, the prolongation portion 3d of the first forward linkage member 3 arranged adjacent the first side frame 2 is formed with an elongated through-hole 24b of a circular arc-shape which is aligned with the connecting pin 9b and extends around the first support pin 3b penetrating the first forward linkage member 3. The connecting pin 9b of the sector gear 9 is further inserted through the elongated through-hole 24b of the first forward linkage member 3. A length of the elongated through-hole 24b is set so as to cancel a difference between pivoting amounts of the forward linkage members 3 and a rotation amount of the sector gear 9, which is produced due to a difference between the distance between the support pins 4a, 4b of the rearward linkage members 4, and the distance between the support pins 3a, 3b of the forward linkage members 3. Incidentally, a width of the elongated through-hole 24b may be set narrow in such a manner that the connecting pin 9b can be slid along the elongated through-hole 24b according to the rotation of the sector gear 9, whereby displacement of the connecting pin 9b in the width direction of the elongated through-hole 24b can be prevented.

An end portion of the connecting pin 9b of the sector gear 9 which is inserted through the elongated through-hole 24b is connected to one end of the rod 10, whereby the sector gear 9 is coupled to the rod 10 at the portion thereof which is eccentric from the first support pin 3b supporting the sector gear 9.

The rod 10 is connected at the other end thereof to the prolongation portion 4d of the first rearward linkage member 4 by a connecting pin 9c, so that rotation power of the sector gear 9 is transmitted to the entire linkage base frame 15 through the rod 10.

Figure 6:
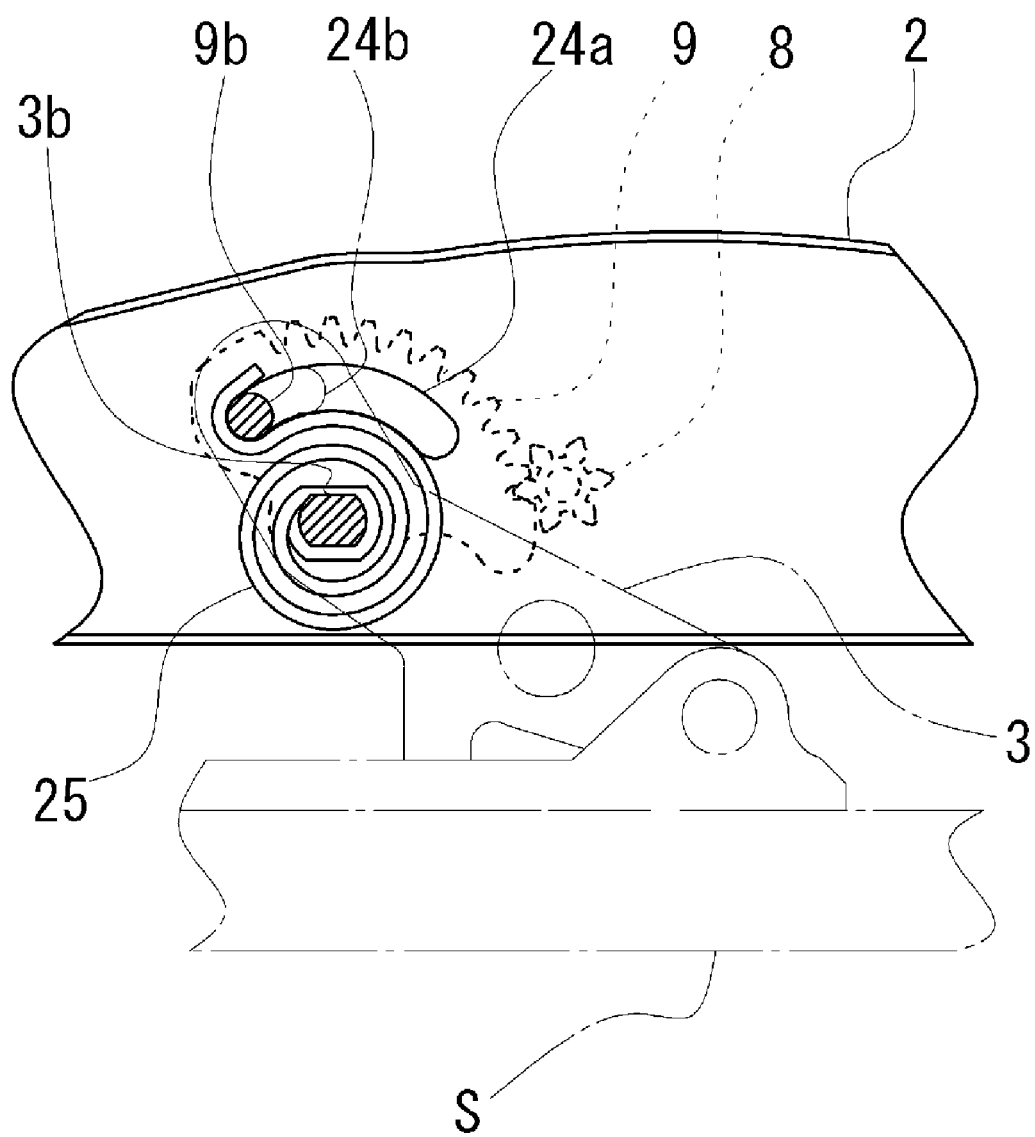
FIG. 6 is a schematic side view of the height adjusting device of the present invention, as view from the inside of a first side frame of a seat cushion of the seat, in which a first spiral spring is employed.

As shown in FIGS. 3 to 5, a first spiral spring 25 is disposed inside the first side frame 2 which is arranged between the first forward linkage member 3 and the sector gear 9. As shown in FIG. 6, the first spiral spring 25 is fixedly retained at an innermost end portion thereof to the first support pin 3b, which supports the sector gear 9 and the first forward linkage member 3, so as to be engaged with the opposite parallel surfaces 3g of the first support pin 3b.

The first spiral spring 25 is wound around the first support pin 3b so as to be unwound from the first support pin 3b according to rearward inclining movement of the forward linkage members 3. An outermost end portion of the first spiral spring 25 is coupled to the connecting pin 9b which interconnects the sector gear 9 and the rod 10, so that the sector gear 9 is urged by the first spiral spring 25 in such a direction as to cause the first forward and rearward linkage members 3, 4 of the linkage base frame 15 to stand up.

Figure 7:
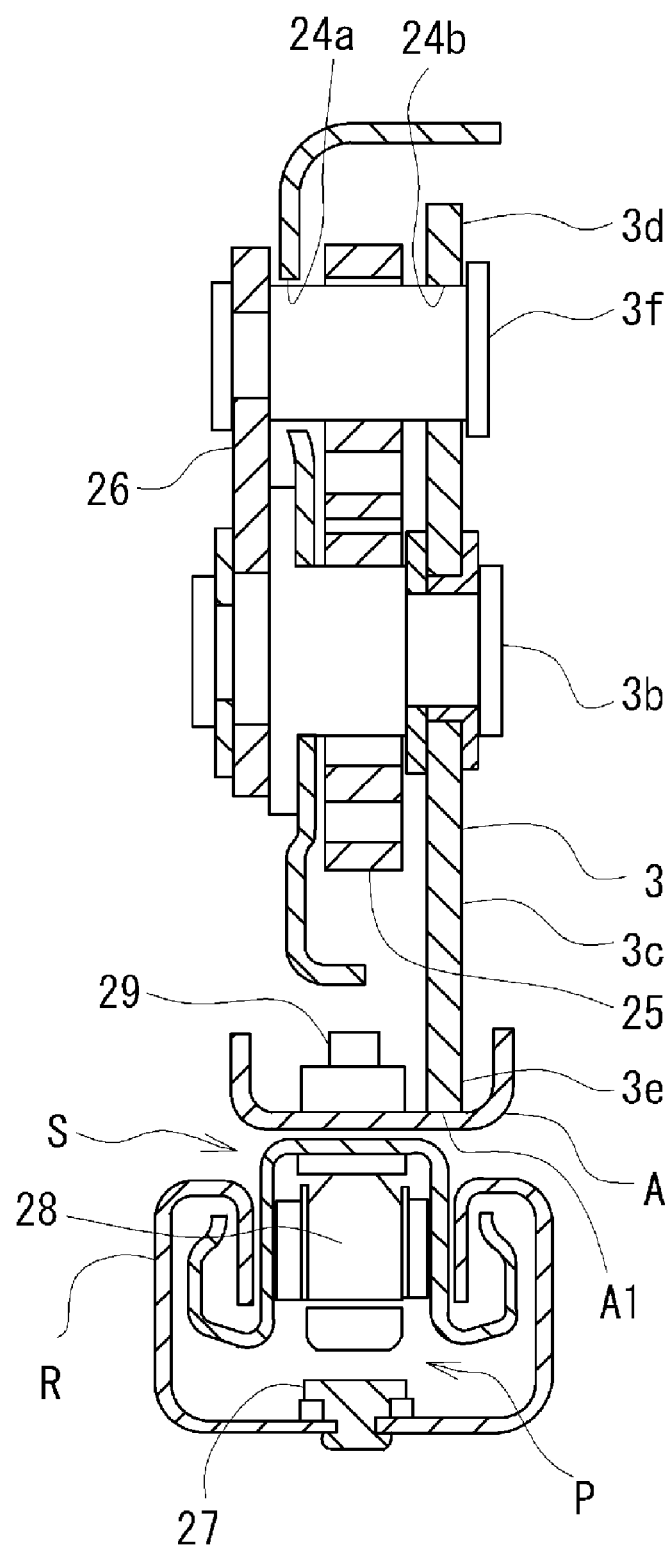
FIG. 7 is a schematic sectional view showing a second side frame of the seat cushion at which an operating knob of the height adjusting device of the present invention is not provided, and parts associated with the second side frame.

On the other hand, on the side of a second side frame of the seat cushion, namely, the side frame to which the operating knob 7 is not mounted, any power transmission means is not provided. As shown in FIG. 7, a reinforcing plate 26 which corresponds in shape to a prolongation portion 3d of the other of the forward linkage members 3, namely, a prolongation portion 3d of a second forward linkage member 3 arranged adjacent the second side frame 2, is arranged outside the second side frame 2. The reinforcing plate 26 is fixedly connected to the prolongation portion 3d of the second forward linkage member 3 by a connecting pin 3f which is inserted through an elongated through-hole 24a of a circular arc-shape formed in a portion of the second side frame 2 which is eccentric from the second support pin 3b of the second forward linkage member 3 which is penetrated through the second side frame 2. The elongated through-hole 24a extends about the second support pin 3b which supports the second forward linkage member 3 and is penetrated through the reinforcing plate 26. The reinforcing plate 26 is pivotable together with the second forward linkage member 3.

Inside the second side frame 2 arranged between the reinforcing plate 26 and the second forward linkage member 3, a second spiral spring 25 for urging the second forward linkage member 3 in such a direction that the second forward linkage member 3 stands up is arranged. The second spiral spring 25 is constructed in the same manner as the above-mentioned first spiral spring 25 is done. More particularly, the second spiral spring 25 is fixedly retained at an innermost end portion thereof to the second support pin 3b, wound around the second support pin 3b so as to be unwound from the second support pin 3b according to rearward inclining movement of the second forward linkage member 3, and engaged at an outermost end portion thereof with the connecting pin 3f. According to the standing-up movement of the second forward linkage member 3 by the action of the second spiral spring 25, the second rearward linkage member 4 also stands up.

In the illustrated example, as shown in FIGS. 5 and 7, there is employed a position sensor system P for sensing relative positions of the upper rail members A and lower rail members R of the slide rail mechanism S and outputting a signal representative of a position of the seat in the automobile.

The position sensor system P comprises sensors 28 attached to the upper rail members A with terminals 29 thereof projecting upward from the upper rail members A, and targets 27 which are to be sensed by the sensors 28 and attached to bottom surfaces of the lower rail members R. Electrical wirings P1 (see FIG. 2) are connected to the terminals 29. Incidentally, the number of the sensors 28 and targets 27 are not limited to a plural but may be at least one.

The sensors 28 are electrically connected through the wirings P1 to various electric or electronic equipments (not shown). For example, signals which are outputted from the sensors 28 and indicative of positions of the seat can be used as signals to control the operation of an airbag at the time of a car crash or the operation of any other devices.

The sensors 28 with the terminals 29, which are mounted to the upper rail members A, and the wirings P1 which are connected to the terminals 29, are arranged at locations different from the abutment regions A1 of the upper rail members A against which the stopper portions 3e, 4e are to be abutted. When the linkage base frame 15 is swung down and the stopper portions 3e, 4e of the forward and rearward linkage members 3, 4 are then abutted against the abutment regions A1, the side frames 2 are kept spaced apart from the upper rail members A, the sensors 28, the terminals 29, and the wirings P1 so as not to contact them.

In the height adjusting device constructed as discussed above, when the entire seat is in the lowermost position as shown in FIG. 2, the sector gear 9 is in a state where it is meshed at one end of the toothed portion thereof with the pinion gear 8, the rod 10 is pushed rearward by the sector gear 9, and the forward and rearward linkage members 3, 4 are kept inclined rearward. At this time, the stopper portions 3e of the forward linkage members 3 and the stopper portions 4e of the rearward linkage members 4 are in a state where they are abutted against the abutment portions A1 of the upper rail members A.

Figure 8:
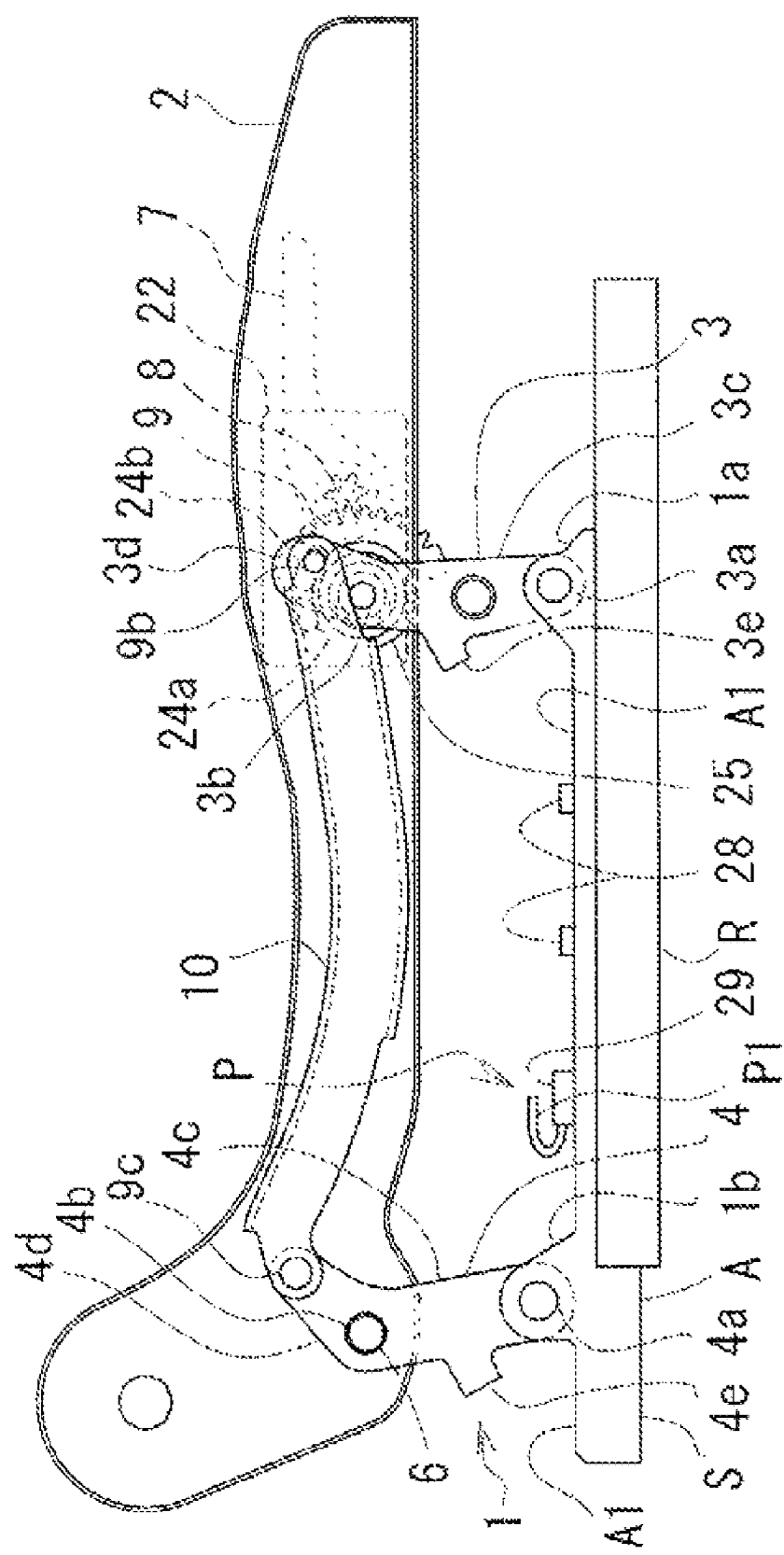
FIG. 8 is a schematic side view of the height adjusting device according to the present invention, in which the seat is in a high position.

In the above-mentioned condition, when the operating knob 7 is manually rotated in the direction indicated by the arrow r1 in FIG. 2, the pinion gear 8 is rotated through the ratchet mechanism 7c, the rotation of the pinion gear 8 is transmitted to the sector gear 9, and the sector gear 9 is then rotated around the first support pin 3b in such a direction as to operatively become meshed at the other end of the toothed portion thereof with the pinion gear 8, while being urged by the first spiral spring 25. Thereby, the rod 10 connected to the sector gear 9 by the connecting pin 9b is pulled and moved forward, the first forward linkage member 3 is pivoted around the support pin 3a so as to stand up and the first rearward linkage member 4 is also pivoted around the support pins 4a so as to stand up. Simultaneously, the second forward linkage member 3 and the second rearward linkage member 4 are pivoted by the action of the second spiral spring 25 so as to stand up. Thus, the linkage base frame 15 is swung upward to thereby cause the entire seat to be lifted up as shown in FIG. 8. After the manual operation of the operating knob 7 is completed and the operating knob 7 is then released from the manual operation, the ratchet mechanism 7c is actuated so as to be engaged with the rotating shaft 7a of the operating knob 7, whereby the height of the seat is maintained constant.

In a case where the seat is to be lowered again, the operating knob 7 is rotated in the direction r2 reverse to the direction r1. By the rotation of the operating knob 7, the linkage base frame 15 is swung downward while being subjected to the weight load of the seat. When the seat reaches the lowermost position as shown in FIG. 2, the stopper portions 3e of the forward linkage members 3 and the stopper portions 4e of the rearward linkage members 4 are abutted against the abutment regions A1 of the upper rail members A, whereby the downward movement of the linkage base frame 15 is limited and the seat then reaches the lowermost position.

The seat height adjusting device constructed as discussed above includes the stopper portions 3e, 4e provided at the forward and rearward linkage members 3, 4 for facilitating keeping of the side frames 2 in positions spaced apart from the upper rail members A, so that even if the occupant on the seat manually operates the operating knob 7 with his/her intention to excessively lower the seat, or any excessive load is applied to the seat in the lowermost position, the side frames 2 can be positively prevented from being contacted with the upper rail members, since the lowermost position of the linkage base frame 15 is limited by the stopper portions 3e, 4e.

Therefore, there is no possibility that the linkage base frame 15, the side frames 2, and the upper rail members A will be damaged and/or deformed. In addition, it is possible to prevent poor engagement between the pinion gear 8 and the sector gear 9 which may be brought about in a case where they are damaged and/or deformed.

In other words, in the height adjusting device, the stopper portions 3e, 4e are provided at the forward and rearward linkage members 3, 4 are adapted to be abutted against the upper rail members A to thereby limit the lowermost position of the seat, so that the seat can be positively prevented from being abutted against the upper rail members A with such a considerably simple structure.

In the automobile seat to which the height adjusting device according to the embodiment of the present invention is applied, the position sensor system P for sensing the positions of the upper rail members A relative to the lower rail members R is employed as discussed above. The sensors of the position sensor system P are provided at the upper rail members A so as to be spaced apart from the abutment regions A1 of the upper rail members A. Therefore, when the stopper portions 3e, 4e are abutted against the abutment regions A1 of the upper rail members, the stopper portions 3e, 4e serve as means to cause the sensors, the terminals and the wirings to be kept spaced apart from the side frames 2, so that even if the occupant tries to excessively lower the seat by operating the operating knob 7, or any excessive load is applied to the seat in the lowermost position, the position sensors, the terminals 29 and the wirings P1 can be positively kept spaced apart from the side frames 2 since the stopper portions 3e, 4e are abutted against the abutment regions A1 of the upper rail members A and the downward movement of the linkage base frame 15 is physically limited by the stopper portions 3e, 4e. Thus, the position sensors, the terminals 29 and the wirings P1 can be positively prevented from being damaged and/or fractured by the side frames 2 of the seat cushion.

Moreover, in the height adjusting device, the power transmission means 20 includes the sector gear 9 supported to the first side frame 2, and the rod 10 coupled between the first forward linkage member 3 and the first rearward linkage member 4 and connected to the sector gear 9 by the connecting pin 9b of the sector gear 9. The sector gear 9 and the first forward linkage member 3 are supported, via the same support pin 3b, to the first side frame 2, so that it is unnecessary to employ a support pin for the sector gear 9 only and a support pin for the first forward linkage member 3 only. Therefore, the number of support pins required in the height adjusting device can be reduced and the height adjusting device can be simply constructed.

In the height adjusting device, the first support pin 3b which supports the sector gear 9 and the first forward linkage member 3 is penetrated through the first side frame 2, the sector gear 9 is arranged outside the first side frame 2, and the first forward linkage member 3 is arranged inside the first side frame 2, so that a stress generated from the sector gear 9 and a stress generated from the first forward linkage member 3 are applied to the both end portions of the first support pin 3b. Therefore, as compared with a case where both the sector gear 9 and the first forward linkage member 3 are arranged outside or inside the first side frame 2, even if the stress from the sector gear 9 and the stress from the first forward linkage member 3 are simultaneously applied to the first support pin 3b, a moment around a portion of the first support pin 3b which is attached with respect to the first side frame 2 can be reduced, and it is possible to ensure high strength and positive operation of the height adjusting device.

Moreover, the first spiral spring 25 for causing the sector gear 9 to be urged in the one direction is arranged on the side of the first side frame 2 which is opposite to the side of the first side frame 2 at which the sector gear 9 is arranged, so that the sector gear 9 can be stably arranged adjacent the first side frame 2. Therefore, even if a biasing force by the first spiral spring 25 and a stress generated from the rod 10 are applied between the first support pin 3b and the connecting pin 9b of the sector gear 9, the deflection of the sector gear 9 can be prevented. Thus, it is possible to ensure stable engagement between the sector gear 9 and the pinion gear 8, and positive operation of the height adjusting device.

Moreover, in the height adjusting device, the first forward linkage member 3 has the prolongation portion 3d formed integrally with the body portion 3c thereof, and the connecting pin 9b interconnecting the sector gear 9 and the rod 10 is coupled to the prolongation portion 3d of the first forward linkage member 3, so that the first forward linkage member 3 is supported at three portions thereof, namely, is supported by the support pin 3a, the first support pin 3b and the connecting pin 9b of the sector gear 9 and, therefore, the first forward linkage member 3 is hard to be deflected. In addition, the first forward linkage member 3, the sector gear 9 and the rod 10 to which a large load is likely to be applied are connected at one point to one another, so that they can be prevented from being deflected independently from one another. Therefore, it is possible to ensure high rigidity of the linkage base frame 15. Even if a large load including the weight load of the seat and the weight load of the occupant on the seat is applied to the seat in the lifted-up state, the linkage base frame 15 can stably support the seat.

Moreover, relative rotation between the sector gear 9 and the first forward linkage member 3 is permitted and the connecting pin 9b interconnecting the sector gear 9 and the rod 10 is connected to the prolongation portion 3d of the first forward linkage member 3 by causing the connecting pin 9b to be inserted through the elongated through-hole 24b of a circular arc-shape formed in the prolongation portion 3d of the first forward linkage member 3. In this case, even if the sector gear 9 and the prolongation portion 3d of the first forward linkage member 3 are coupled to each other by the connecting pin 9b, it is possible to cause a rotation amount of the sector gear 9 and a pivoting amount of the first forward linkage member 3 to be different from each other. Therefore, a pivoting amount of the first rearward linkage member 4 connected through the rod 10 to the sector gear 9, and the pivoting amount of the first forward linkage members 3 can be different from each other, thus making it possible to ensure positively swinging movement of the linkage base frame 15.

The first forward linkage member 3 and the first rearward linkage member 4 are biased, through the sector gear 9 and the rod 10, in such a direction as to stand up, by the first spiral springs 25, and the second forward linkage member 3 and the second rearward linkage member 4 are biased by the second spiral spring 25 in such a direction as to stand up, so that even if the weight load of the seat and/or the weight load of the occupant on the seat is applied to the linkage base frame 15, it is possible to easily cause the seat to be lifted up with resort to the actions of the spiral springs 25 when the operating knob 7 is operated. Therefore, as compared with a case where the spiral springs are not employed, it is possible to easily operate the operating knob with a reduced operating-force.

The first spiral spring 25 is fixedly retained at the innermost end portion thereof to the first support pin 3b supported to the first side frame 2, and engaged at the outermost end portion thereof with the connecting pin 9b of the sector gear 9 through which the first forward linkage member 3 and the rod 10 are coupled to each other. The second spiral spring 25 is fixed at the innermost end portion thereof to the second support pin 3b attached to the second side frame 2, and engaged at the outermost end portion thereof with the connecting pin 3f of the second forward linkage member 3. Therefore, additional support members for supporting the spiral springs 25 only are not required, thus making it possible to reduce the number of parts required in the height adjusting device, and cause the construction of the height adjusting device to be simplified.

On the side of the second side frame 2 at which the operating knob 7 is not provided, the second forward linkage member 3 is biased by the second spiral spring 25 in such a direction as to be pivoted about the support pin 3a. Therefore, as compared with a case where the second forward linkage member 3 is biased linearly, it is possible to provide a stable biasing force to the second forward linkage member 3, regardless of the swinging amount of the linkage base frame 15 and the pivoting amount of the second forward linkage member 3. On the other hand, on the side of the first side frame 2 at which the operating knob 7 is provided, the sector gear 9 is biased by the first spiral spring 25 in such a direction as to be rotated about the first support pin 3b. Therefore, as compared with a case where the sector gear 9 is biased linearly, it is possible to provide a stable biasing force to the sector gear 9, regardless of the swinging amount of the linkage base frame 15 and the rotation amount of the sector gear 9.

On the side of the second side frame 2 at which the operating knob 7 is not provided, the second forward linkage member 3 is directly biased by the second spiral spring 25 without any additional member, so that a loss of the biasing force by the second spiral spring 25 is reduced, thus making it possible to effectively bias the second forward linkage member 3.

On the other hand, on the side of the first side frame 2 at which the operating knob 7 is provided, the first spiral spring 25 is engaged at the outermost end portion thereof with the connecting pin 9b interconnecting the sector gear 9 and the rod 10, so that the biasing force of the first spiral spring 25 can be applied directly to the sector gear 9 in such a direction as to cause the sector gear 9 to be rotated. Therefore, as compared to a case where the biasing force is applied through any another member to the sector gear, it is possible to ensure a smooth operation of the sector gear 9 and improve the operability of the height adjusting device.

In the height adjusting device, the first and second spiral springs 25 are arranged laterally of the side frames 2 and, therefore, installation spaces for the first and second spiral springs 25 can be obtained in vertical directions of the side frames 2, so that large-sized spiral springs may be employed as the first and second spiral springs 25. In this case, sufficient biasing forces can be exerted by the large-sized spiral springs.

Moreover, in the height adjusting device according to the present invention, the linkage base frame 15 is arranged inside the side frames 2, the operating knob 7 is mounted to the gear case 22 which is arranged outside the first side frame 2 and fixed to the first side frame 2, and the pinion gear 8 and the sector gear 9 are housed in the gear case 22, so that the operating knob 7, the pinion gear 8 and the sector gear 9 can be arranged regardless of the location at which the first forward linkage member 3 of the linkage base frame 15 is supported to the first side frame 2. Therefore, an adequately sized pinion gear and an adequately sized sector gear can be arranged adjacent the first side frame 2. Even if any load is applied to the pinion gear 8 and the sector gear 9 from the rod 10, the deflection of the pinion gear 8 and sector gear 9 can be prevented by an outer surface of the first side frame 2 and an inner surface of the gear case 22, so that stable engagement between the pinion gear 8 and the sector gear 9 can be ensured and smooth operations of the pinion gear 8 and the sector gear 9 can be ensured with the simple structure.

The sector gear 9 which is supported to the first side frame 2 is arranged outside the first side frame 2 and connected, via the connecting pin 9b, to the rod 10 arranged inside the first side frame 2, and the pinion gear 8 is meshed with the sector gear 9 and located forwardly of the connecting pin 9b of the sector gear 9, so that even if a force to push the sector gear 9 in a forward direction is applied to the sector gear 9 due to the load applied from the rod 10, the stable engagement between the pinion gear 8 and the sector gear 9 can be ensured.

Moreover, the rotating shaft 7a of the operating knob 7 on which the pinion gear 8 is mounted is supported to both the first side frame 2 and the gear case 22 and, therefore, the pinion gear 8 is also held by both the first side frame 2 and the gear case 22, so that disengagement of the pinion gear 8 from the sector gear 9 can be prevented and, therefore, the stable engagement between the pinion gear 8 and the sector gear 9 is ensured.

In addition, the sector gear 9 and the pinion gear 8 are interposedly held between the first side frame 2 and the inwardly deformed region 22b of the gear case 22 in such a manner that they are rotatable, so that the sector gear 9 and/or the pinion gear 8 can be prevented from being displaced and/or deformed in a width direction thereof, thus making it possible to also ensure the stable engagement between the sector gear 9 and the pinion gear 8.

Incidentally, while the stopper portions 3e, 4e are provided at the forward and rearward linkage members 3, 4 in the illustrated embodiment, any protrusions may be provided on the abutment regions A1 of the upper rail members A in lieu of the stopper portions 3e, 4e provided at the linkage members 3, 4. In addition, while the case where the present invention is applied to the slide type seat has been discussed above, the present invention may be applied to a seat which is mounted on a floor of the automobile through the linkage base frame and brackets. Moreover, while the case where the first and second spiral springs 25 are mounted around the first and second support pins 3b of the forward linkage members 3 of the linkage base frame 15 has been discussed above, the spiral springs 25 may be mounted around the support pins 4b of the rearward linkage members 4. Thereby, it is possible to indirectly cause the forward linkage members 3 to be biased in such a direction that the forward linkage members 3 stand up, and directly cause the rearward linkage members 4 to be biased in such a direction that the rearward linkage members 4 stand up. Moreover, while the case where the power transmission means 20 including the pinion gear 8 and the sector gear 9 has been discussed above, the present invention is not limited to such a case, and a power transmission means which includes any suitable arms and any suitable plate members which are coupled to the prolongation portion 3d of the first forward linkage member 3 and operable with the manual operation of the operating knob 7 may be employed.

The terms and expression which have been employed herein are used as terms of description, not of limitation. There is no intention in the use of such terms and expressions of excluding any equivalents of the features shown and described or portions thereof. However, it is recognized that various modifications are possible within the scope of the invention claimed.

What is claimed is:

1. A height adjusting device for adjusting a height of a seat for an automobile, said automobile seat including a seat cushion having first and second spaced apart side frames, and spaced apart brackets provided on predetermined installation-surfaces for supporting said seat, said height adjusting device comprising:
    a linkage base frame provided between said first and second side frames and said brackets so as to be vertically swingable, so that said seat is supported through said linkage base frame to said brackets so as to be vertically movable;
    said linkage base frame comprising a pair of forward linkage members spaced apart from each other, a first connecting shaft interconnecting said forward linkage members, a pair of rearward linkage members spaced apart from each other, and a second connecting shaft interconnecting said rearward linkage members, each of said forward and rearward linkage members being bridged between corresponding one of said first and second side frames and corresponding one of said brackets so as to be collapsable;
    an operating knob arranged outside one of said first and second side frames and supported to the one of said first and second side frames;
    power transmission means coupling said operating knob and said linkage base frame for transmitting to said linkage base frame power generated according to operation of said operating knob and causing said linkage base frame to be vertically swung, to thereby cause said seat to be vertically moved; and
    stopper means provided at said linkage base frame for abutting against said installation-surfaces and limiting downward movement of said seat and keeping said seat in a lowermost position at which said first and second side frame frames of said seat are spaced apart from said installation surfaces.

2. A height adjusting device according to claim 1, wherein said stopper means comprises projection-shaped stopper portions projecting from portions of said forward and rearward linkage members which are adapted to be opposed to said installation surfaces when said linkage base frame is swung downward.

3. A height adjusting device according to claim 1, wherein said seat includes a slide rail mechanism comprising a pair of lower rail members mounted on a floor of said automobile and a pair of upper rail members slidably supported to said lower rail members, and a position sensor system provided at said slide rail mechanism for sensing relative positions between said upper rail members and said lower rail members, said position sensor system including position sensors provided on said upper rail members, each of said brackets being mounted on corresponding one of said upper rail members, and said stopper means being adapted to serve as means to causes said position sensors to be spaced apart from said side frames when said seat reaches the lowermost position.

4. A height adjusting device according to claim 1, wherein said power transmission means includes a power transmission member supported, via a support pin, to the one of said first and second side frames so as to be rotatable about said support pin according to the operation of said operating knob, and a rod coupled between corresponding one of said rearward linkage members and a portion of said power transmission member which is eccentric from said support pin, one of said forward linkage members being supported, through said support pin, to the one of said first and second side frames.

5. A height adjusting device according to claim 4, wherein said support pin is penetrated through the one of said first and second side frames, said power transmission member is arranged outside the one of said first and second side frame and supported to said support pin, and the one of said forward linkage members is arranged inside the one of said first and second side frame and supported to said support pin.

6. A height adjusting device for adjusting a height of a seat for an automobile, said automobile seat including a seat cushion having first and second spaced apart side frames, and spaced apart brackets for supporting said seat, said height adjusting device comprising:

a linkage base frame provided between said first and second side frames and said brackets so as to be vertically swingable, so that said seat is supported through said linkage base frame to said brackets so as to be vertically movable;

said linkage base frame comprising a pair of forward linkage members spaced apart from each other, a first connecting shaft interconnecting said forward linkage members, a pair of rearward linkage members spaced apart from each other, and a second connecting shaft interconnecting said rearward linkage members, each of said forward and rearward linkage members being bridged between corresponding one of said first and second side frames and corresponding one of said brackets so as to be collapsible;

an operating knob arranged outside one of said first and second side frames and supported to the one of said first and second side frames; and power transmission means coupling said operating knob and said linkage base frame for transmitting to said linkage base frame power generated according to operation of said operating knob and causing said linkage base frame to be vertically swung, to thereby cause said seat to be vertically moved;

said power transmission means including a power transmission member supported, via a support pin, to the one of said first and second side frames so as to be rotatable about said support pin according to the operation of said operating knob, and a rod coupled between corresponding one of said rearward linkage members and a portion of said power transmission member which is eccentric from said support pin; and one of said forward linkage members including a body portion supported to corresponding one of said brackets and a prolongation portion extending from said body portion, said portion of said power transmission member and said rod being connected to the prolongation portion of the one of said first and second forward linkage members.

7. A height adjusting device according to claim 6, wherein said body portion of the one of said forward linkage members is supported to said support pin supporting said power transmission member.

8. A height adjusting device according to claim 7, wherein said body portion of the one of said forward linkage members and said power transmission member are supported to said support pin so as to be rotatable relative to each other, said portion of said power transmission member and said rod are connected to each other by a connecting pin, and said prolongation portion of the one of said forward linkage members is formed with an elongated through-hole of a circular arc-shape, said connecting pin being inserted through said elongated through-hole.

9. A height adjusting device for adjusting a height of a seat for an automobile, said automobile seat including a seat cushion having first and second spaced apart side frames, and spaced apart brackets for supporting said seat, said height adjusting device comprising:

a linkage base frame provided between said first and second side frames and said brackets and supported to said first and second side frames by support pins so as to be vertically swingable, so that said seat is supported through said linkage base frame to said brackets so as to be vertically movable;

said linkage base frame comprising a pair of forward linkage members spaced apart from each other, a first connecting shaft interconnecting said forward linkage members, a pair of rearward linkage members spaced apart from each other, and a second connecting shaft interconnecting said rearward linkage members, each of said forward and rearward linkage members being bridged between corresponding one of said first and second side frames and corresponding one of said brackets so as to be collapsible;

an operating knob arranged outside one of said first and second side frames and supported to the one of said first and second side frames; and power transmission means coupling said operating knob and said linkage base frame for transmitting to said linkage base frame power generated according to operation of said operating knob and causing said linkage base frame to be vertically swung, to thereby cause said seat to be vertically moved; and spiral springs arranged inside said first and second side frames for biasing said linkage base frame in such a direction that said linkage base frame stands up, said spiral springs being fixed at innermost end portions thereof to said support pins and wound around said support pins.

10. A height adjusting device according to claim 9, wherein outermost end portions of said spiral springs wound around said support pins are engaged with said forward linkage members.

11. A height adjusting device for adjusting a height of a seat for an automobile, said automobile seat including a seat cushion having first and second spaced apart side frames, and spaced apart brackets for supporting said seat, said height adjusting device comprising:

a linkage base frame provided between said first and second side frames and said brackets and supported to said first and second side frames by first and second support pins so as to be vertically swingable, so that said seat is supported through said linkage base frame to said brackets so as to be vertically movable;

said linkage base frame comprising a pair of forward linkage members spaced apart from each other, a first connecting shaft interconnecting said forward linkage members, a pair of rearward linkage members spaced apart from each other, and a second connecting shaft interconnecting said rearward linkage members, each of said forward and rearward linkage members being bridged between corresponding one of said first and second side frames and corresponding one of said brackets so as to be collapsible;

an operating knob arranged outside one of said first and second side frames and supported to the one of said first and second side frames;

power transmission means coupling said operating knob and said linkage base frame for transmitting to said linkage base frame power generated according to operation of said operating knob and causing said linkage base frame to be vertically swung, to thereby cause said seat to be vertically moved;

said power transmission means comprising a power transmission member supported, via said first support pin, to the one of said first and second side frames so as to be rotatable about said support pin according to the operation of said operating knob, and a rod coupled, via a connecting pin, between corresponding one of said rearward linkage members and a portion of said power transmission member which is eccentric from said support pin;

a first spiral spring arranged inside the one of said first and second side frames for biasing said linkage base frame in such a direction that said linkage base frame stand up;

said first spiral spring being fixed at an innermost end portion thereof to said first support pin, wound around said first support pin, and engaged at an outermost end portion thereof with said connecting pin; and a second spiral spring arranged inside the other of said first and second side frames for biasing said linkage base frame in such a direction that said linkage frame stands up;

said second spiral spring being fixed at an innermost end portion thereof to said second support pin, wound around said second support pin, and engaged at an outermost end portion thereof with one of said forward linkage members.

12. A height adjusting device for adjusting a height of a seat for an automobile, said automobile seat including a seat cushion having first and second spaced apart side frames, and spaced apart brackets for supporting said seat, said height adjusting device comprising:

a linkage base frame provided between said first and second side frames and said brackets so as to be vertically swingable, so that said seat is supported through said linkage base frame to said brackets so as to be vertically movable;

said linkage base frame comprising a pair of forward linkage members spaced apart from each other, a first connecting shaft interconnecting said forward linkage members, a pair of rearward linkage members spaced apart from each other, and a second connecting shaft interconnecting said rearward linkage members, each of said forward and rearward linkage members being bridged between corresponding one of said first and second side frames and corresponding one of said brackets so as to be collapsable;

one of said first and second side frames having a gear case which is arranged outside the one of said first and second side frames and mounted to the one of said first and second side frames;

an operating knob arranged outside one of said first and second side frames;

said operating knob having a rotating shaft penetrated through said gear case and the one of said first and second side frame; and power transmission means coupling said operating knob and said linkage base frame for transmitting to said linkage base frame power generated according to operation of said operating knob and causing said linkage base frame to be vertically swung, to thereby cause said seat to be vertically moved;

said power transmission means comprising a pinion gear housed within said gear case and mounted on said rotating shaft of said operating knob, a sector gear housed within said gear case, meshed with said pinion gear and supported through a support pin to the one of said first and second side frames so as to be rotatable about said support pin according to the operation of said operating knob, and a rod arranged inside the one of said first and second side frames and coupled between corresponding one of said rearward linkage members and a portion of said sector gear power transmission member which is eccentric from said support pin, one of said forward linkage members being supported, through said support pin, to the one of said first and second side frames.

13. A height adjusting device according to claim 12, wherein said operating knob is provided with a ratchet mechanism for allowing rotation of said rotating shaft to be releasably stopped per a predetermined angle of the rotation of said rotating shaft.

14. A height adjusting device according to claim 12, wherein the one of said first and second side frames has an elongated through-hole formed therein, said rod and said portion of said sector gear are connected to each other by a connecting pin which is penetrated through said elongated through-hole of the one of said first and second side frames, and said pinion bear is arranged forwardly of said connecting pin in said gear case.

15. A height adjusting device according to claim 12, wherein said rotating shaft of said operating knob is rotatably supported to the one of said first and second side frames.

16. A height adjusting device according to claim 12, wherein said sector gear and said pinion gear are interposedly held by said gear case and the one of said first and second side frames so as to be rotatable.

\* \* \* \* \*